United States Patent

Cornils

[19]

[11] Patent Number: 5,944,822
[45] Date of Patent: Aug. 31, 1999

[54] CHANNEL ISOLATION ARRANGEMENT AND METHOD FOR DISSOCIATED DATA

[75] Inventor: Curtis Lee Cornils, Chandler, Ariz.

[73] Assignee: Motorola, Inc., Schaumburg, Ill.

[21] Appl. No.: 08/912,539

[22] Filed: Aug. 18, 1997

[51] Int. Cl.⁶ .................................................. G06F 12/14
[52] U.S. Cl. ............................................ 713/200; 713/201
[58] Field of Search ........................... 395/186, 187.01, 395/188.01, 182.02, 293, 299, 309, 311, 200.68

[56] References Cited

U.S. PATENT DOCUMENTS

| | | | |
|---|---|---|---|
| 3,924,240 | 12/1975 | Given | 340/172.5 |
| 5,392,446 | 2/1995 | Tower et al. | 395/800 |
| 5,548,721 | 8/1996 | Denslow | 395/187.01 |
| 5,586,265 | 12/1996 | Beukema | 395/200.09 |
| 5,682,478 | 10/1997 | Watson et al. | 395/200.12 |
| 5,696,911 | 12/1997 | Fredriksson | 395/286 |
| 5,761,451 | 6/1998 | Abert et al. | 395/293 |
| 5,761,518 | 6/1998 | Boehling et al. | 395/821 |
| 5,787,427 | 7/1998 | Benantar et al. | 395/187.01 |
| 5,826,014 | 10/1998 | Coley et al. | 395/187.01 |
| 5,832,483 | 11/1998 | Barker | 707/8 |
| 5,841,988 | 11/1998 | Chennubhotla et al. | 395/200.67 |
| 5,845,068 | 12/1998 | Winiger | 395/186 |

*Primary Examiner*—Robert W. Beausoliel, Jr.
*Assistant Examiner*—Pierre E. Elisca
*Attorney, Agent, or Firm*—Frank J. Bogacz

[57] ABSTRACT

A method allows computer systems to handle different classes of data that are not allowed to intermingle. The method ensures that elements of the computer system not associated with a given class of data could not read from or write to the system bus while data of a different class is being transported across the system bus (10). At the same time, the method ensures that the elements of the computer system that are associated with the given class of data being transported across the bus 10 are given access to the bus (10) and the data. This is accomplished by using a single bus (10), controlling system element access to the bus with transceivers (21–31). The transceivers (21–31) are turned on or off by signals derived from system knowledge of the class of data allowed to be read or written by each system element and hence the class of data on the bus (10).

17 Claims, 3 Drawing Sheets

5,944,822

CHANNEL ISOLATION ARRANGEMENT AND METHOD FOR DISSOCIATED DATA

BACKGROUND OF THE INVENTION

The present invention pertains to communications and more particularly to data security in communication systems.

Computer systems often handle classes of data (such as security levels) that must not be permitted to intermingle due to the criticality of their data content such as in banking or safety applications. An isolated path must be established for transmitting a given class of data between elements of the computer system with assurance that the data has been transmitted from the proper source, has been received by an authorized recipient and that unauthorized elements of the system have not intercepted or altered the data.

Separate buses (one for each class of data) can be established between elements of the computer system but this arrangement makes the system overly complex as the number of security levels increases. Separate buses dictate custom hardware composition for the computer system elements as they must have the ability to interface to the various buses for each class of data and must incorporate logic that permits their association with certain classes of data and prohibits their association with other security levels. Separate buses also make the system less flexible if the rules governing which elements of the computer system are associated with which classes of data should change.

It would be advantageous to have a means by which a single computer bus may be used to convey the various classes of data in a manner that ensures that the different classes of data remain physically isolated. That is, each of the computer elements connected to the bus at any given time must all be authorized to transmit and receive a common class of data.

DESCRIPTION OF THE PREFERRED EMBODIMENT

This invention fills the need to associate classes of data with computer subsystem elements and to isolate computer subsystem elements from inappropriate data in accordance with a static or dynamic set of rules of association in a multi-processor subsystem employing commercially available computer devices. It uses ordinary bus transceivers (such as Integrated Device Technology part number FCT 162245) to accomplish the isolation of computer system elements from interaction with the transfer of an inappropriate class of data. These bus transceivers are controlled either by a hardware or software based system bus arbiter.

The hardware system bus arbiter employs logic circuitry for enabling bus transceivers to connect the bus to a given device based on the bus arbiter's register contents that are programmed by a trusted computer system element. The software based system bus arbiter employs a trusted computer or microprocessor system having sufficient discrete I/O to control the isolation transceivers along with software for implementing the data processing unit/data class associations either statically or dynamically. The soft-warebased system bus arbiter may be incorporated as a part of the trusted system element.

In a standard computer system, a subsystem element must obtain use of the bus for transferring data to another subsystem element without the interference of other subsystem elements during the process. Various schemes are employed by the different computer architectures in allocating the bus to its various subsystem elements but all provide setting protocols for any subsystem element to access the bus. Examples of these protocols are round robin (where each subsystem element is granted access in turn) and granting by priority (where high priority subsystem elements are granted more frequent bus access than others). The present invention provides an overlay of the priority scheme of any given bus with rules associating subsystem elements with classes of data for controlling the bus transceivers in the interfaces to all subsystem elements. These rules can allow each subsystem element to receive or transmit only the data at the subsystem element's own data class or to receive all data from a subset of the total data class set of subsystem elements as well as transmit its own. In this way, the invention permits computer bus operations using the given architecture's standard arbitration protocols for all permitted bus interactions while isolating subsystem elements from inappropriate data classes. Because all computer buses have data lines that can be blocked with ordinary bus transceivers and because all computer buses employ bus arbitration schemes that can be intercepted and overlaid with data class/processor device associations, this invention is applicable to any standard bus including PCI, PCMCIA and VME bus structures. The present invention to provides data separation in a wide variety of commercial architectures.

Figure 1:
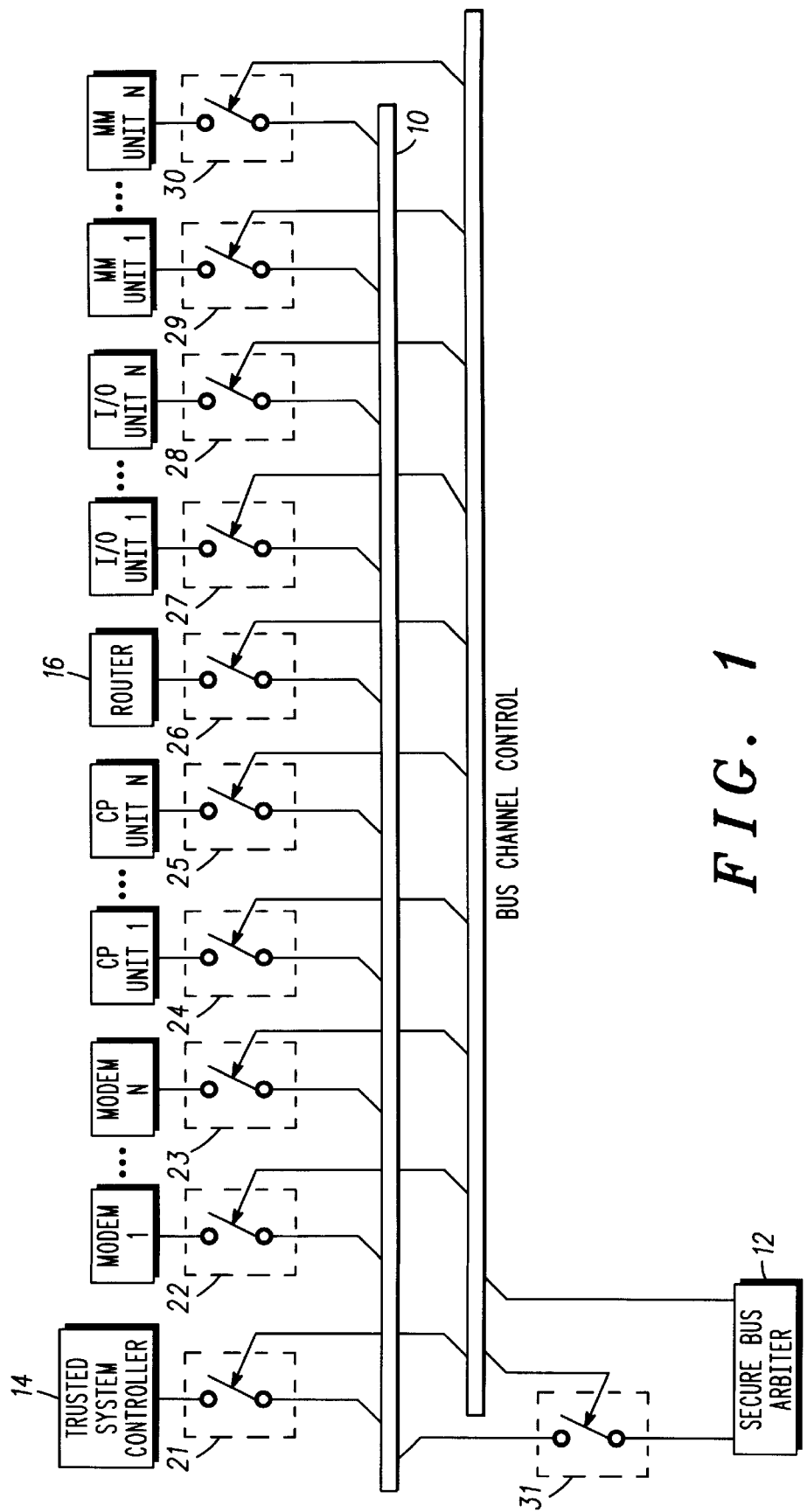
FIG. 1 is a block diagram of the hardware showing how the flow of information is controlled in accordance with the present invention.

FIG. 1 is a block diagram that shows an example of the use of this invention in a computer system used primarily for communications. The system is comprised of the following processor devices: computer (not shown) that, for example, might be the primary computer-human interface; I/O units (I/O Unit 1 through I/O Unit n) for interfacing to digital systems such as ethernet; a router 16 for packetized data protocols; multi-media units (MMU 1 through MMU n) for voice or video coding; cryptoprocessors (CPU 1 through CPU n) for data encryption; modems (1 through n) for connection to wireless receiver/transmitters; and a Trusted System Controller 14 for key management and critical control functions.

All communication is via a standard bus 10. In this example, data is being input via data channel 1 to the I/O Unit 1. The data transmitted is passed securely over the bus 10 to the Router 16 where it is packetized and then delivered to cryptoprocessor CPU 1 for encryption and delivery to modem 1 for modulation to allow subsequent tranmission by modem 1. Each data transfer over this data path requires a separate usage of the bus 10, yet this invention provides isolation of the data over the bus 10 from all other elements coupled to the bus 10 and not associated with this security level.

The invention physically isolates the single computer bus to a single class of data for a given data transfer insulating it from devices associated with other classes of data (according to the rules of association). Bus transceivers, 21 through 31, are placed between bus 10 and each processor device in the data lines (and optionally in the address lines). The bus transceivers, 21 through 31, are each processor device's bus interface and also act as switches, closing along a permitted path and opening to prevent eavesdropping or injection of false data by devices not associated with the permitted path. Control of the bus transceiver switches 21 through 31 is accomplished by a hardware or software based secure bus arbiter 12. Secure bus arbiter 12 control circuitry may be embedded into the bus 10 backbone as illustrated in FIG. 1 or may be incorporated into a standard computer system element. However, in either case, each bus transceiver's controls are accessible only to the secure bus arbiter 12. The secure bus arbiter 12 is configured to act in accordance with rules of association between the processor devices and classes of data by a trusted system element. In the example of FIG. 1, the Trusted System Controller 14 is the trusted system element and configures the secure bus arbiter 12 to follow the rules of association.

Classes of data and their rules of association with processor devices are identified by the computer system's control function (not shown), transmitted to the Trusted System Controller 14 and programmed into the secure bus arbiter 12. This programming may be static, taking place only upon initialization of the computer system, or it may be dynamic under the control of software executed by the Trusted System Controller 14. These associations between security levels and processor devices are combined by the secure bus arbiter 12 with other bus management processes such as bus access priorities set by the computer system's control function (not shown) or by other non-trusted system elements (not shown). Data originating in a processor device identified as being associated with a given class of data is assumed to be at that processor device's security level. Other processor devices can receive that data only if they have the appropriate data class assignment as defined by the rules of association. The normal operation of bus 10 directs the data to the target processor device. That target processor device will receive the data only if it has the correct data class association. For example, assume that I/O Unit 1 resides in a data security system and has been identified by the Trusted System Controller 14 as being able to process secret data. In that case I/O Unit 1 is now associated with a security level of "secret". Any request for use of the bus by I/O Unit 1 and subsequent grant of the bus 10 will cause the secure bus arbiter 12 to close each of the bus transceivers 21 through 31 that interface with those processor devices that are also qualified to process "secret" data. All other transceivers 21 through 31 interfacing with processor devices that are not associated with secret data will be opened. The data transmitted by I/O Unit 1 can thus be received only by those processor devices associated with the security level of "secret".

Figure 2:
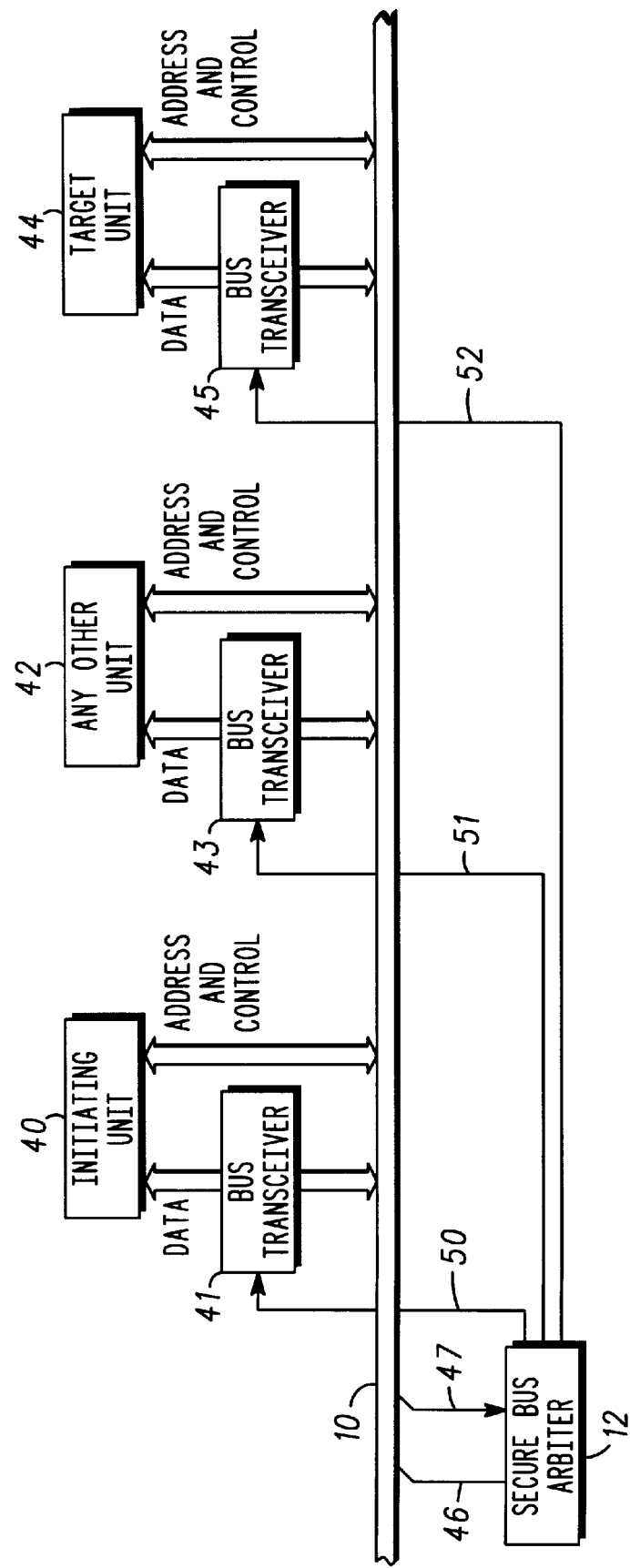
FIG. 2 is a block diagram that shows details of the control function in accordance with the present invention.

FIG. 2 illustrates the data transfer process for a PCI bus data transfer. By means of its unique bus request line 46, an initiating agent unit 40 calls for use of the bus 10 for transfer of data to a target agent unit 44. The secure bus arbiter 12 has previously received the class of data of data, associated with the initiating agent unit 40, from the Trusted System Controller 14. The Trusted System Controller 14 has also informed the secure bus arbiter 12 of the data class of the target agent unit 44. If the transfer is permitted, and, assuming the initiating agent unit 40 has the highest current priority to use bus 10, the secure bus arbiter 12 grants bus access to the initiating agent unit 40 by sending bus grant on lead 2. Simultaneously with or prior to granting bus access to the initiating agent unit 40, the secure bus arbiter 12 sends a signal on lead 50 to the bus transceiver 41 of the initiating agent unit 40 that closes the transceiver connecting the initiating agent unit 40 to the bus 10. The secure bus arbiter 12 also sends a signal on lead 52 to the bus transceiver 45 of the target agent unit 44 that closes the transceiver along the permitted path. The secure bus arbiter 12 also sends signal 51 that opens the bus transceiver 43 of any other agent unit 42 on the bus 10 not associated with the class of data of the permitted path. The "secret" data transfers then take place between initiating agent unit 40 to target agent unit 44.

The secure bus arbiter 12 shown is the hardware implementation and accomplishes this process during the same time that the normal hardware bus arbitration would require. Once the transfer is complete, the invention's secure bus arbiter 12 immediately grants the bus 10 to the next priority user and isolates the bus 10 in accordance with the new class of data being transferred.

The implementation shown in FIG. 1 and detailed in FIG. 2 can be accomplished by a custom mother board including all of the circuitry and required card slots. The implementation can also be by means of a supplementary board including the bus transceivers and the required standard card slots that is plugged into a standard mother board.

Figure 3:
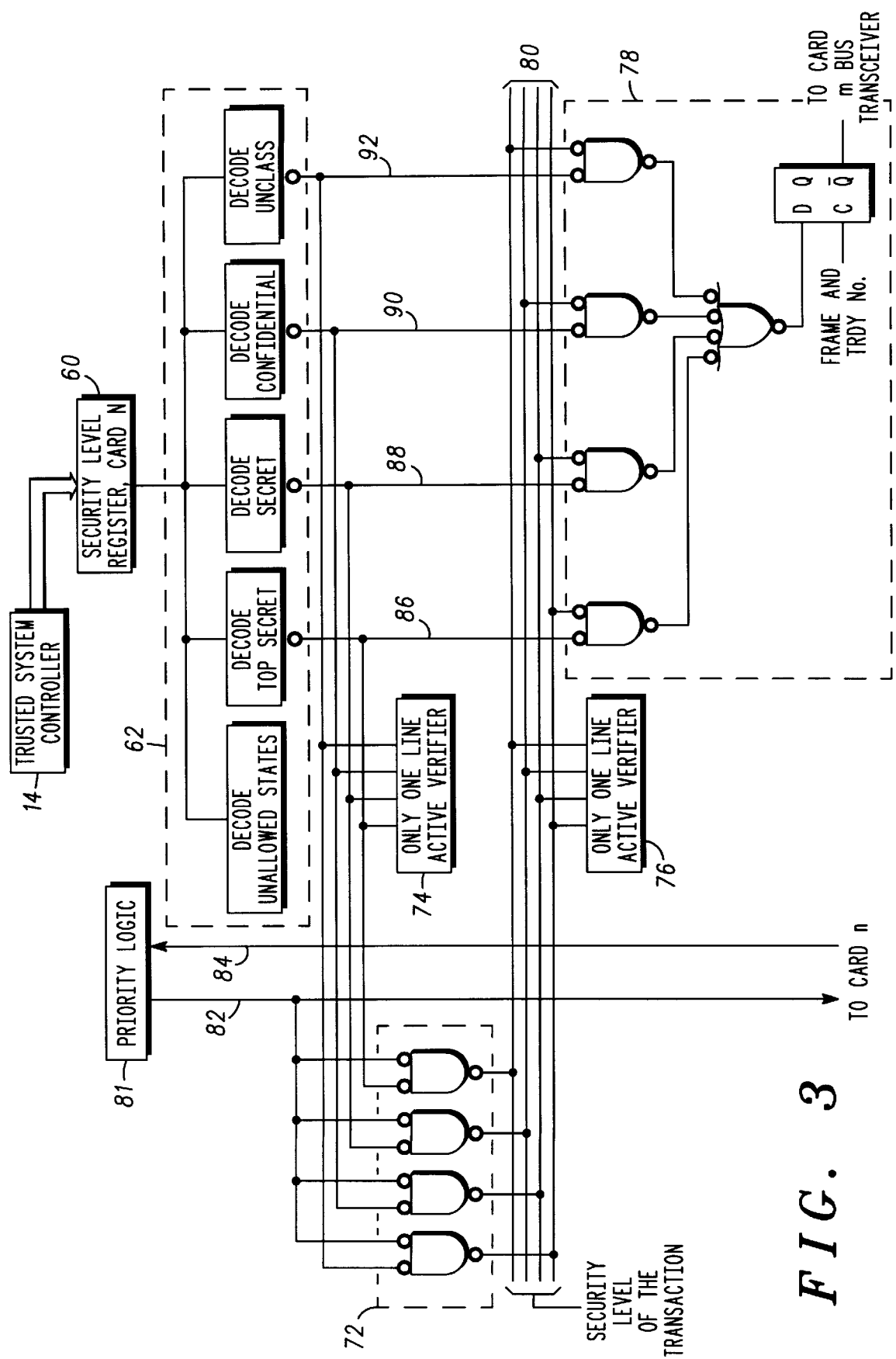
FIG. 3 is a block diagram that shows a segment of the secure bus arbiter circuitry function in accordance with the present invention.

FIG. 3 is a block diagram that shows an example of a segment of secure bus arbiter 12 circuitry used for a PCI bus data transfer in a data security system illustrating the simplicity of the logic involved. An addressable latch 60, within the secure bus arbiter 12, is previously programmed by the Trusted System controller 14 with the security level assigned to the processor device requesting the bus 10. When a processor device requests access to bus 10, the processor device's request is made via its bus request line 84. Using the output of the addressable latch 60, the security decoder 62 provides signals on lines 86, 88, 90 and 92 indicating the security level of the processor device requesting access to the bus. If the priority logic 81 sends a bus grant signal on lead 82 to the requesting processor device, the requesting processor device's security signal lines 86, 88, 90 and 92 are made to drive the security level bus 80 by the security bus driver 72. All other segments (not shown) of the secure bus arbiter 12 are also represented by the circuitry shown in FIG. 3. For any given segment, its comparator 78 compares the security level of the security bus 80 with that of the segment's own security decoder 62 output. If they agree, the comparator 78 enables the transceiver of that segment transceiver Thereby, bus access is granted to the requesting processor device and to other processor devices associated with the data security level of the requesting processor device. Overall security is provided by verifier 74 that ensures that only one signal line 86, 88, 90 and 92 is energized at one time and verifier 76 that ensures that only one line of the security level bus 80 is energized at one time. Communication thus takes place while the bus request is active or until a timer in the priority logic 81 limits the duration of the communication and ends the bus grant.

This invention ensures that processor devices not associated with a given class of data cannot read the data or write to the bus to insert data of a different class or corrupt the given data as it is being transported across the bus. While one class of data is being transmitted on the computer bus, only devices permitted to handle the given class of data are enabled to receive this data while devices not associated with the current class of data are prevented from accessing this data. The result is a time-division multiplexing of the computer bus among elements associated with various classes of data.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An arrangement for channel isolation comprising:

a bus for transmitting data among a plurality of processor units;

said plurality of processor units transmitting/receiving said data of different classes to/from others of said plurality of processor units, each of said plurality of processor units being coupled to said bus;

a plurality of bus transceivers, each bus transceiver of said plurality of bus transceivers corresponding to one of said plurality of processor units, each of said plurality of bus transceivers for controlling access to said bus by a corresponding one of said plurality of processor units, each of said plurality of bus transceivers coupled to said corresponding one of said plurality of processor units and coupled to said bus;

a bus arbiter for controlling access to said bus by one of said plurality of processor units to allow data transfer with others of said plurality of processor units, if a common data class of said data is common to said one of said plurality of processor units and to at least one of said others of said plurality of processor units, said bus arbiter coupled to said bus and to said plurality of bus transceivers, said bus arbiter enabling at least one of said plurality of bus transceivers with said common data class; and a trusted system controller for dynamically programming said bus arbiter with different common data classes and rules of association.

2. An arrangement for channel isolation as claimed in claim 1, wherein:

said bus arbiter is further coupled to each of said plurality of processor units by a bus request lead and a bus grant lead;

said bus request lead for transmitting a request to said bus arbiter from one of said plurality of processor units; and said bus grant lead for transmitting a grant of control of said bus to said one of said plurality of processor units.

3. An arrangement for channel isolation as claimed in claim 2, wherein said coupling of each of said plurality of processor units to said bus includes:

an address bus for transmitting addresses of data among said plurality of processor units; and a data bus transmitting said data of different classes among said plurality of processor units.

4. An arrangement for channel isolation as claimed in claim 3, wherein each coupling of said plurality of bus transceivers to said bus arbiter includes an enable/disable lead for enabling and disabling one bus transceiver of said plurality of bus transceivers corresponding to said one of said plurality of processor units from said bus so that said corresponding one of said plurality of processor units may transmit and receive said data and alternatively so that said corresponding one of said plurality of processor units may not receive and transmit said data.

5. An arrangement for channel isolation as claimed in claim 4, wherein said bus arbiter includes a priority logic circuit, upon a request for access to said bus from said one of said plurality of processor units, said priority logic circuit grants access to said one of said plurality of processor units based on first-in being first-granted.

6. An arrangement for channel isolation as claimed in claim 5, wherein said priority logic circuit further grants access to said one of said plurality of processor units on a predetermined set of priorities.

7. An arrangement for channel isolation as claimed in claim 6, wherein said bus arbiter includes:

a security level register corresponding to each of said plurality of processor units, said security level register receives, from a trusted system controller, an authorized class of said data for each of said plurality of processor units, said security level register latches said authorized class of said data.

8. An arrangement for channel isolation as claimed in claim 7, wherein said bus arbiter further includes:

a security decoder corresponding to each of said plurality of processor units, each said security decoder uses an authorized class of said data for each of a corresponding plurality of said processor units to provide a first single active line, said security decoder coupled to a corresponding said security level register.

9. An arrangement for channel isolation as claimed in claim 8, wherein said bus arbiter includes:

a security bus driver for receiving notification from said priority logic circuit of an access grant to said one of said plurality of processor units requesting access to said bus, said security bus driver coupled to said priority logic circuit;

said security bus driver receiving a signal from said security decoder corresponding to said authorized class of said data of said one of said plurality of processor units requesting access to said bus; and said security bus driver provides a single active line to a security level bus.

10. An arrangement for channel isolation as claimed in claim 9, wherein said security bus driver includes:

a set of gates, one gate of said set of gates corresponding to said authorized class of said data; and said set of gates are such that there is only one active line on said security level bus, corresponding to said authorized class of said data for said one of said plurality of processor units requesting access to said bus.

11. An arrangement for channel isolation as claimed in claim 9, wherein said bus arbiter includes a first only-one-line active verifier for ensuring that only one output of said security decoder is active.

12. An arrangement for channel isolation as claimed in claim 9, wherein said bus arbiter includes a second only-one-line active verifier for ensuring that only one output of said security bus driver is active.

13. An arrangement for channel isolation as claimed in claim 9, wherein said bus arbiter further includes:

a comparator for each of said plurality of processor units, said comparator compares said authorized class of said data indicated by said security decoder with said authorized class of said data of said one of said plurality of processor units requesting access to said bus; and if said comparator determines that said one of said plurality of processor units is allowed access to said authorized class of said data on said bus, said one bus transceiver of said plurality of bus transceiver couples said one of said plurality of processor units to the bus.

14. An arrangement for channel isolation as claimed in claim 13, wherein each said comparator includes:

a set of gates for comparing a first active line from said security level bus with a second active line from said security decoder;

if said first and second active lines are inputs to a same gate of said set of gates, said comparator sends a signal to the corresponding one of said plurality of processor units; and said one bus transceiver provides access to said bus for the corresponding said corresponding one of said plurality of processor units.

15. A method for channel isolation among a plurality of processor units coupled to a bus comprising the steps of:

requesting by a first of said plurality of processor units access to said bus to communicate with others of said plurality of processor units that have a common data class;

determining by a bus arbiter which of said plurality of processor units are authorized for the common data class;

enabling bus transceivers by said bus arbiter corresponding to others of said plurality of processor units having the common data class;

ensuring that said bus arbiter does not enable said bus transceivers of the others of said plurality of processor units not having the common data class; and providing by a trusted system controller to said bus arbiter a data class associated with each of said plurality of processor units.

16. A method for channel isolation among a plurality of processor units as claimed in claim 15, wherein there is further included a step of maintaining the data class associated with each of said plurality of processor units within said bus arbiter, while said first of said plurality of processor units communicates with said others of said plurality of processor units having the common data class.

17. A method for channel isolator among a plurality of processor units as claimed in claim 16, wherein said step of maintaining is performed until terminated by a timer.

* * * * *